United States Patent
Allen et al.

(10) Patent No.: US 6,957,161 B2
(45) Date of Patent: Oct. 18, 2005

(54) INFORMATION HANDLING SYSTEM INCLUDING POWER SUPPLY SELF DIAGNOSTICS

(75) Inventors: Robert Allen, Cedar Park, TX (US); William O. Bain, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 10/670,908

(22) Filed: Sep. 25, 2003

(65) Prior Publication Data

US 2005/0071111 A1 Mar. 31, 2005

(51) Int. Cl.[7] ............................................. G01D 3/00
(52) U.S. Cl. ..................................... 702/108; 324/72.5
(58) Field of Search .......................... 702/108, 22, 117, 702/115, 122–124; 324/72.5, 500, 73.1, 615, 158.1, 644; 713/2; 361/97; 340/650; 36/97

(56) References Cited

U.S. PATENT DOCUMENTS

| | | | |
|---|---|---|---|
| 4,357,574 A | * | 11/1982 | Takamisawa et al. ...... 324/72.5 |
| 4,414,601 A | * | 11/1983 | Conroy, Jr. .................. 361/97 |
| 4,891,743 A | | 1/1990 | May et al. |
| 6,502,044 B1 | | 12/2002 | Lane et al. |
| 2004/0215953 A1 | * | 10/2004 | Cantwell et al. ............... 713/2 |

OTHER PUBLICATIONS

Sentry Installation & Service Instruction Manual, Power Supply Unit Model 535, 1993.
Sun Sparc Storage Array Model 200, Jul. 1997.

* cited by examiner

*Primary Examiner*—Michael Nghiem
*Assistant Examiner*—Xiuqin Sun
(74) *Attorney, Agent, or Firm*—Haynes and Boone, LLP

(57) ABSTRACT

An information handling system (IHS) is provided which includes a power supply with a self diagnostics feature. The power supply supplies power to a test load resistor for a predetermined brief test period. The test period selected is sufficiently short so that a relatively small power rating load resistor is not overheated during the load test. A first indicator is activated if power good is indicated after the load test. This provides a notification that the power supply is operating properly. If power good is not indicated after the load test then a test is conducted to see if the supply is connected to the system board. If the supply is not connected to the system board and power good is not indicated, then a second indicator is activated to conclusively notify of power supply failure However, if the supply is found to be connected to the system board and power good is not indicated, then a third indicator is activated to notify the user that the source of failure is undetermined.

26 Claims, 3 Drawing Sheets

INFORMATION HANDLING SYSTEM INCLUDING POWER SUPPLY SELF DIAGNOSTICS

BACKGROUND

The disclosures herein relate generally to information handling systems (IHS's) and more particularly to diagnostics for IHS's.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many modern IHS's include a system board and a power supply connected to the system board to provide power thereto. The system board typically includes a processor, memory, bus structure and various supporting components. When an IHS customer contacts a call center for service, both the system board and power supply are components to be considered for service. Diagnosing an IHS problem over a telephone or on-line connection with a customer can be difficult for a service technician. Customers sometimes return power supplies for replacement when the power supplies are in fact 100% operational.

What is needed is a way to more accurately diagnose power supply failure in an information handling system.

SUMMARY

Accordingly, in one embodiment, a method is disclosed for testing a power supply in an information handling system (IHS). The method includes activating a diagnostic test circuit in the power supply for a first time period. The method also includes supplying power, by the power supply, to a test load resistor in the power supply for a second time period within the first time period. The second time period is controlled by the diagnostic test circuit and is selected to be sufficiently short to prevent overheating of the test load resistor. Advantageously, the power rating of the test load resistor can be very small by using this technique.

In another embodiment, an information handling system (IHS) is disclosed which includes a system board having a processor. The IHS also includes a power supply for supplying power to the system board. The power supply includes a diagnostic test actuation mechanism and a diagnostic test circuit which in response to actuation of the test actuation mechanism is activated for a first time period. The power supply also includes a test load resistor to which power is supplied by the power supply for a second time period within the first time period. The second time period is controlled by the diagnostic test circuit and is set to be sufficiently short to prevent overheating of the test load resistor.

A principal advantage of the embodiments disclosed herein is that the user of an information handling system can readily test the power supply using the included self diagnostics capability.

DETAILED DESCRIPTION

Figure 1:
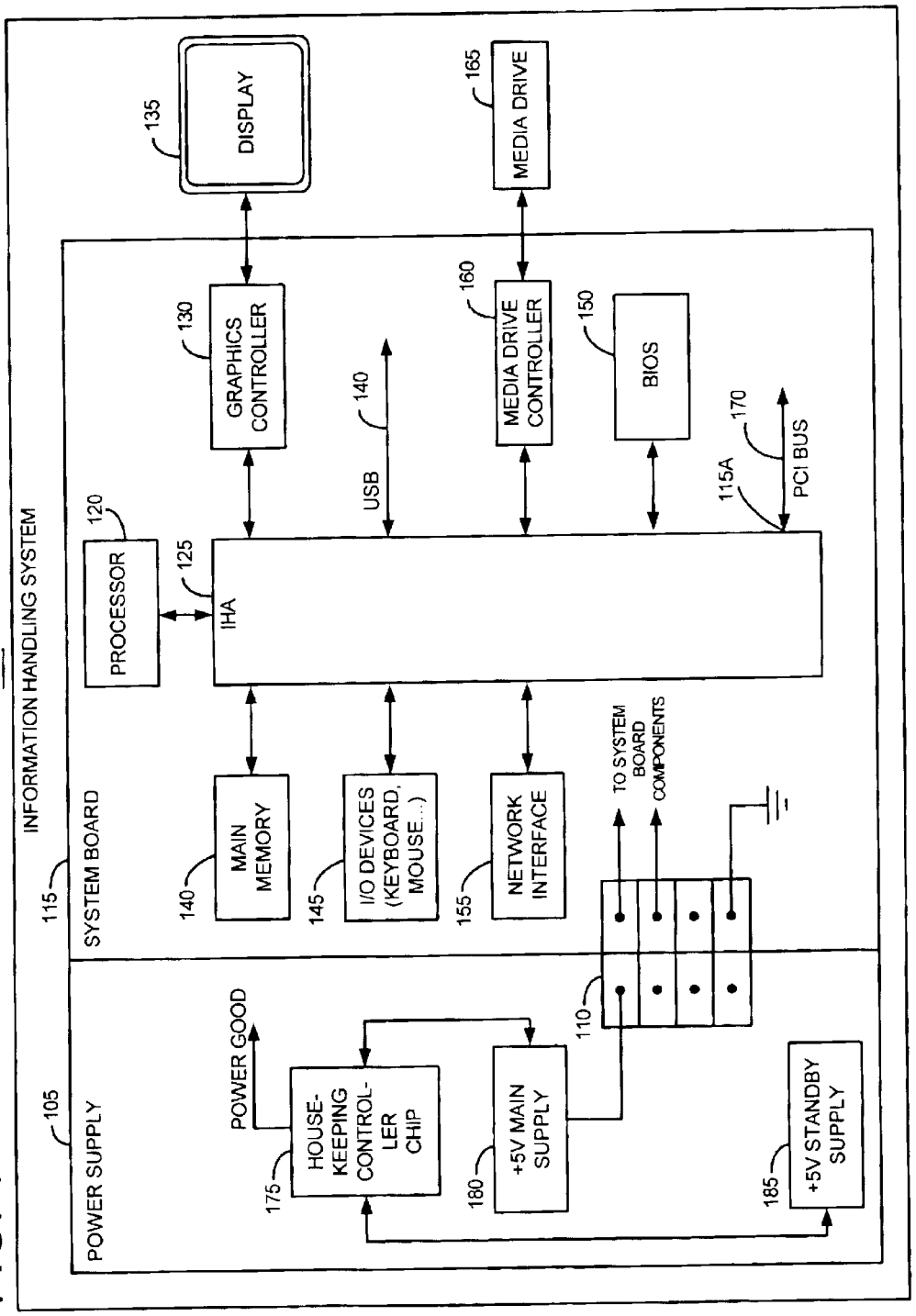
FIG. 1 is a block diagram of an embodiment of the disclosed information handling system.

FIG. 1 is a block diagram of the disclosed information handling system (IHS) 100. For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

IHS 100 includes a power supply 105 with self-diagnosis capabilities. Power supply 105 is coupled via connector 110 to system board 115 to provide power to components on system board 115. System board 115 includes a processor 120 such as an Intel Pentium series processor or one of many other processors currently available. An Intel Hub Architecture (IHA) chipset 125 provides IHS 100 with glue-logic that connects processor 120 to other components of IHS 100. Chipset 125 carries out graphics/memory controller hub functions and I/O functions. More specifically, chipset 125 acts as a host controller which communicates with a graphics controller 130 coupled thereto. Graphics controller 130 is coupled to a display 135. Chipset 125 also acts as a controller for main memory 140 which is coupled thereto. Chipset 125 further acts as an I/O controller hub (ICH) which performs I/O functions. Input devices 145 such as a mouse, keyboard, and tablet, are also coupled to chipset 125 at the option of the user. A universal serial bus (USB) 140 or other I/O bus is coupled to chipset 125 to facilitate the connection of peripheral devices to IHS 100. The system basic input-output system (BIOS) 150 is coupled to chipset 125 as shown. BIOS 150 is stored in nonvolatile memory such as CMOS or FLASH memory. A network interface controller (NIC) 155 is coupled to chipset 125 to facilitate connection of system 100 to other information handling systems. A media drive controller 160 is coupled to chipset 125 50 that devices such as media drive 165 can be connected to chipset 125 and processor 120. Devices that can be coupled to media drive controller 160 include CD-ROM drives. DVD drives, hard disk drives and other fixed or removable media drives. IHS 100 includes an operating system which is stored on media drive 165. Typical operating systems which can be stored on media drive 165 include (Microsoft Windows XP, Microsoft Windows 2000 and the Linux operating systems. (Microsoft and Windows are trademarks of Microsoft Corporation.) An expansion bus 170, such as a Peripheral Component Interconnect (PCI) bus, PCI Express bus, SATA bus or other bus is coupled to chipset 125 as shown to enable IHS 100 to be connected to other devices which provide IHS 100 with additional functionality.

Power supply 105 includes a housekeeping controller chip 175 which monitors the components of supply 105 and controls the operation thereof. More particularly, housekeeping chip 175 is coupled to both a main 5 volt power supply 180 and a standby 5 volt power supply 185. Main power supply 180 provides the main power source for IHS 100 when IHS 100 and power supply 105 are fully powered up. Standby power supply 185 provides very low standby power when IHS 100 is turned off and when main power supply 180 is powered down. Main power supply 180 is coupled via connector 110 to the system board components of system board 115. It is noted that housekeeping controller chip 175 is a conventional controller chip which monitors the various supply voltages generated by power supply 105. Controller chip 175 generates a POWER GOOD signal that indicates whether or not these voltages are within a prescribed range of voltages. The POWER GOOD signal is also referred to as the PSU OK, or power supply unit OK signal.

Figure 2:
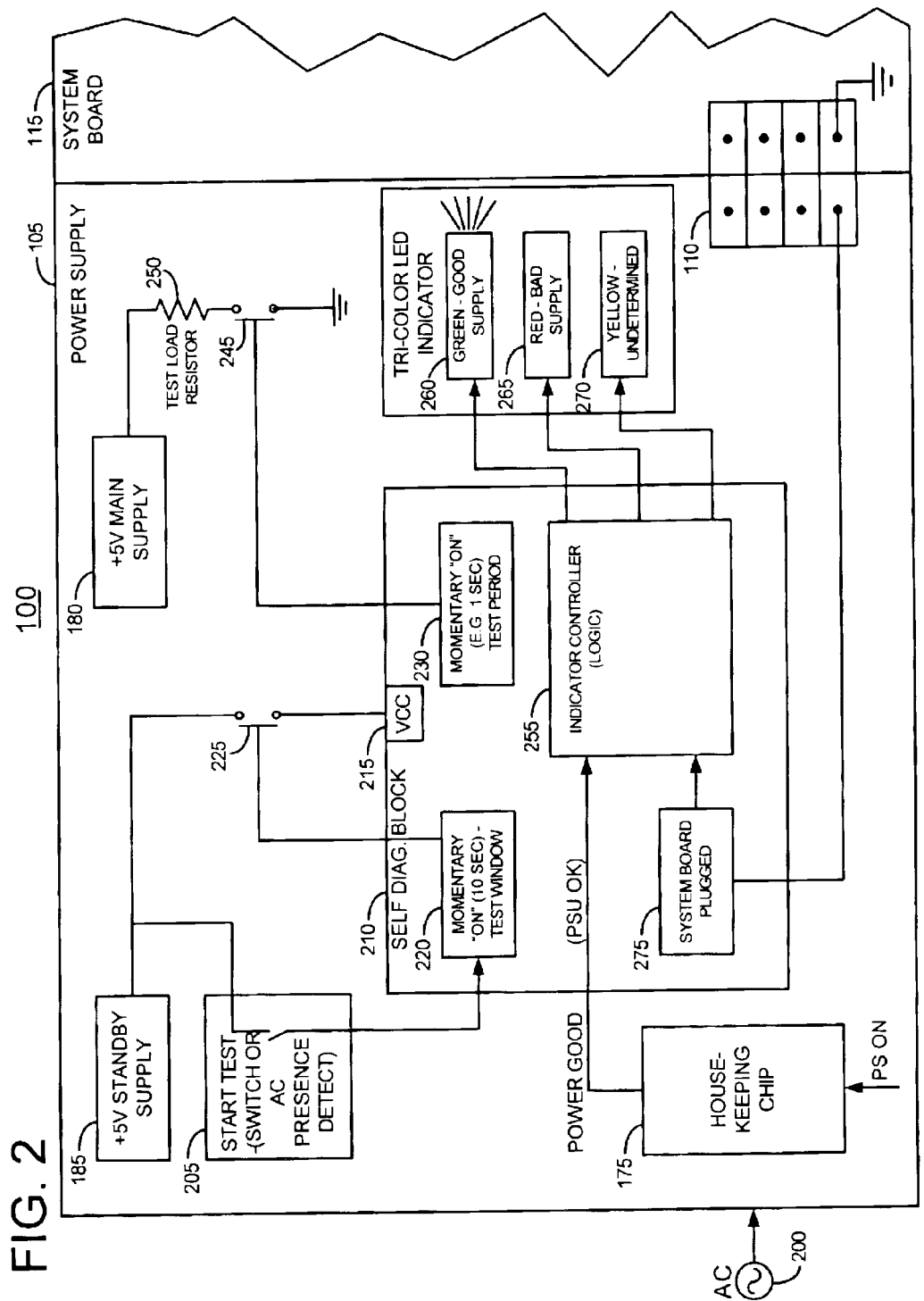
FIG. 2 is a block diagram of the information handling system of FIG. 1 including a more detailed block diagram of the power supply portion of the system.

FIG. 2 is a more detailed block diagram of power self diagnostic power supply 105. Alternating current (AC) is provided to power supply 105 by an AC source 200 coupled thereto. When an IHS user contacts a service center by phone or on-line connection, the user may be asked to instruct power supply 105 to perform a self diagnosis to determine if the power supply is operating properly. The user initiates the diagnosis by activating a start test switch 205. Start test switch 205 is coupled to a self diagnosis block 210 which includes a voltage input VCC 215 as shown. Self diagnosis block 210 controls the diagnostic testing of power supply 105 as subsequently discussed. When start test switch 205 is activated, momentary-on logic 220 is activated within self diagnosis block 210. Momentary-on logic 220 closes a switch 225 between standby power supply 185 and VCC input 215 for a predetermined time period or "test window", for example 10 seconds. In this manner, the period of diagnostic testing is limited and does not burden IHS 100 during normal operation. This feature helps IHS 100 meet Federal Energy Management Program standards which aim to minimize standby power consumption.

During the above-described "test window", additional momentary-on logic 230 activates a switch 245 to briefly couple main supply 180 to ground via a test load resistor 250. Thus, power is supplied to test load resistor 250 for a brief instant called the "test period". This test of main supply 180 lasts for just a short test period, for example a 1 sec. test period. Of course the actual duration of the test period can vary. What is important is that for a particular test load resistor power rating the test period be sufficiently long to determine if the power supply is operating properly and sufficiently short in duration that the resistor does not overheat. In this example, the 1 second test period of main supply 180 is within the 10 second test window during which power is supplied to self diagnosis block 210.

As will be described in more detail later, if power supply 105 is found to be operating properly as indicated by the POWER GOOD signal from housekeeping chip 175, then logic within indicator controller 255 causes GREEN LED 260 to emit green light. If the POWER GOOD signal does not indicate power good and it is found that power supply 105 is not connected to system board 115, then logic within indicator controller 255 causes RED LED 265 to glow red to conclusively indicate a bad supply. However, if the POWER GOOD signal does not indicate power good and it is found that power supply 105 is connected to system board 115, then as explained later in more detail, logic within indicator controller 255 causes YELLOW LED 270 to glow yellow indicating an undetermined diagnosis. The diagnostics can not determine whether the problem is in system board 115 or power supply 105 in this case.

Housekeeping chip 175 includes a power supply on (PS ON) input. When the PS ON input receives an appropriate signal from system board 115 after the user pushes a power button to turn on the IHS, housekeeping chip 175 turns the IHS's power supply 105 on. As mentioned earlier, the self diagnostic power supply test commences when the user activates start test switch 205. Alternatively, the test could commence once AC from AC supply 200 is detected by power supply 105. It was found to be helpful to have a forced cool down period at the beginning of the test after the start test switch 205 was pushed or AC was detected. This assures that test load resistor 250 has sufficient time to cool down from the last time the test was conducted. A cool-down retest time delay of 30 to 60 seconds is representative, however, this delay can be less than or greater than this range depending on the value and power rating of test load resistor 250. Load resistors with a lower power rating require a larger delay whereas load resistors with a higher power rating require al smaller delay.

Figure 3:
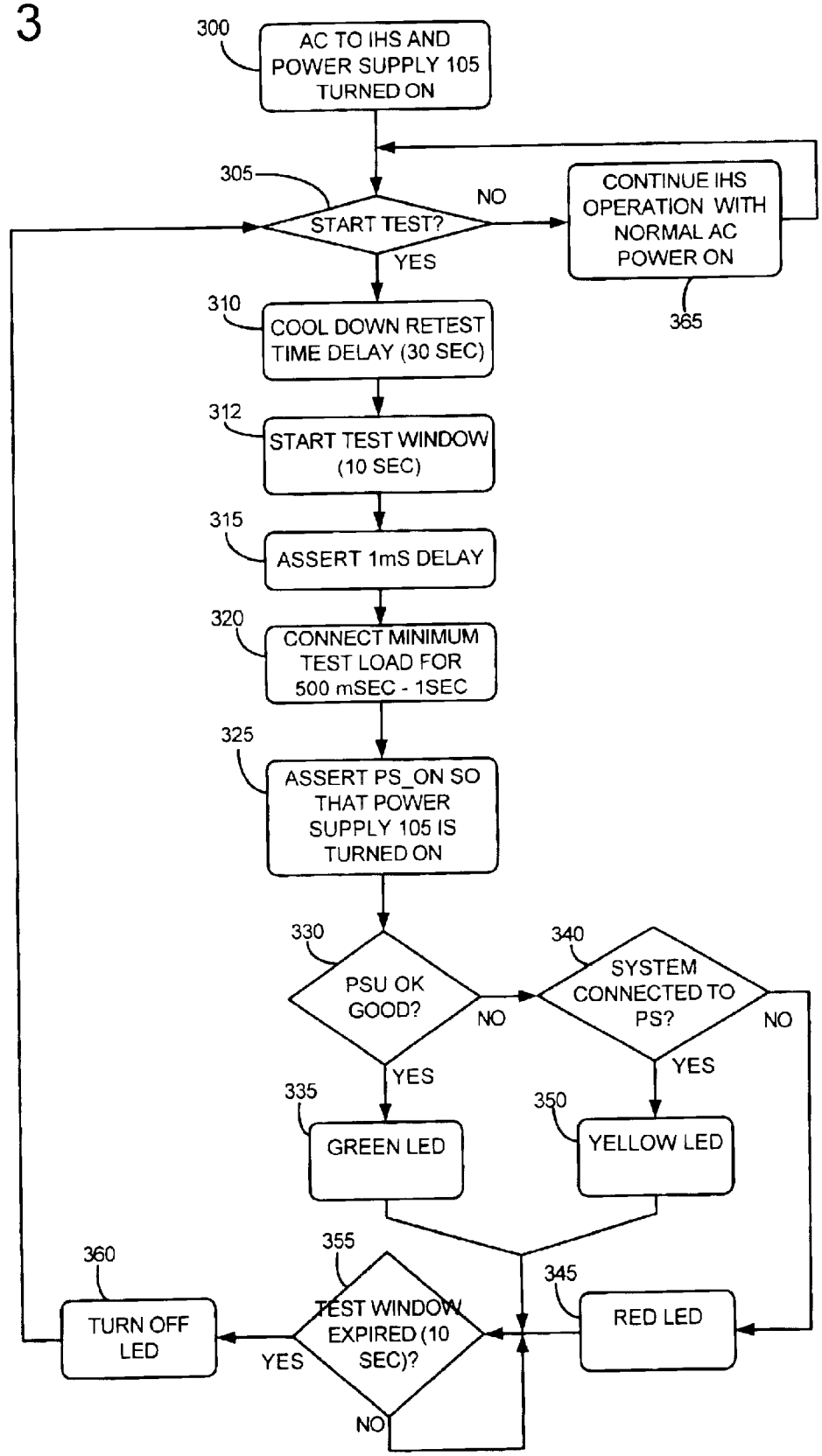
FIG. 3 is a flowchart depicting power supply operation and problem diagnosis in the information handling system of FIG. 1.

FIG. 3 is a flow chart which shows how logic within self diagnostics block 210 operates in cooperation with the rest of power supply 105 to conduct testing of power supply 105. Operation of IHS 100 commences when AC power from AC source 200 is supplied to the IHS and the IHS is turned on. System board 115 sends a signal to the PS ON input of housekeeping chip 175 instructing power supply 105 to turn on as per block 300 of the flow chart. A test is then conducted at decision block 305 to determine if the power supply self diagnostics test should begin. This is accomplished by checking to see if the user has pressed the start test switch or by checking to see if AC has been detected being sent to the power supply. If either of these events occurs, then a cool-down retest time delay of 30 seconds, for example, is forced at block 310 by logic in self diagnostics block 210 before testing continues. This permits load resistor 250 to cool down if it has been subjected to recent prior testing.

Once this cool down time delay expires, at block 312, momentary-on logic 220 starts a 10 second "test window" during which diagnostics testing is conducted and completed. Diagnostics block 210 is powered up during the test window and powered down when it ends. The test period includes a short time delay, as per block 315, which is sufficiently long to permit the POWER GOOD output, also called PSU OK, of housekeeping chip 175 to yield a status.

Representative time delays are 1 mS–20 mS although shorter and longer time delays are acceptable as long as the delay is sufficiently long to yield a POWER GOOD or PSU OK status and sufficiently short to fit within the 10 second test window. Once within the test window and after the above described delay, momentary-on logic 230 briefly closes switch 245 to momentarily supply power from main supply 180 to test load resistor 250 as per block 320. As explained earlier, power is supplied to test load resistor 250 for a short period of time, for example 0.5 to 1 seconds, a period long enough to conduct load testing but not so long that the resistor is overheated. Selecting a very short test period such as above permits the load resistor to be small in both size and expense. Then the PS_ON input of housekeeping chip 175 receives a turn on signal from system board 115 as per block 325. This instructs power supply 105 to turn on. Housekeeping chip 175 generates a POWER GOOD signal, also called PSU OK, which is fed to self diagnostics block 210. The POWER GOOD signal is fed to indicator controller 255 so that controller 255 can be apprised as to how well power supply 105 is functioning.

Indicator controller 255 interprets the power supply test being conducted and activates an appropriate one of LED's 260, 265 and 270 according to whether or not the power supply is functioning properly, not functioning properly, or that it can not be determined whether a problem is in the power supply or system board. Indicator controller 255 tests at decision block 330 to determine if the PSU OK signal is good. If so, the power supply is operating properly and green LED 260 is lit as per block 335. However, if the PSU OK is not good, indicating that there is a problem in either the power supply or the system board, then process flow continues to another decision block 340. At decision block 340 a test is conducted to determine if power supply 105 is connected to system board 115. In one embodiment this is done by connecting a pin of connector 110 to ground on the system board side as shown in FIG. 2. System board plugged logic 275 checks a corresponding pin of 110 on the power supply side of the connector to see if the power supply connector 110 is plugged into the system board. System board plugged logic 275 is connected to indicator controller 255 such that indicator controller 255 is informed as to whether or not system board 115 is connected to the power supply 105. Returning to the flow chart of FIG. 3, if the PSU OK signal is not good, thus indicating a possible problem, then as mentioned above, a test is conducted at decision block 340 to determine if the system board is connected to the power supply. If the system board is not connected to the power supply, then it is conclusive that the power supply is the source of the problem and the red LED 265 is turned on as per block 345. However, if the system board is found to be connected to the power supply, then it can not be determined if the problem is in the power supply or the system board. The problem could be in either. In this event yellow LED 270 is lit as per block 350. After any of LED's 260, 265 and 270 is lit, a test is conducted at decision block 355 to determine if the 10 second test window has expired. When the test window expires, the lit LED is turned off as per block 360. Process flow then continues back to decision block 305. If the start test button is not pressed again, diagnostics is exited and normal computer operation commences as per block 365.

When an IHS user contacts a service call center either by phone or on-line connection, the service technician can instruct the user to commence the above described power supply diagnostics test. Advantageously, the disclosed methodology and apparatus provide a very convenient way for the user to test a power supply in an IHS. Conducting such tests should dramatically reduce the number of perfectly operational power supplies that are returned to the IHS manufacturer.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of testing a power supply in an information handling system (IHS), the method comprising:
    activating a diagnostic test circuit in the power supply for a first time period; and
    supplying power, by the power supply, to a test load resistor in the power supply for a second time period within the first time period, the second time period being controlled by the diagnostic test circuit; and
    monitoring a power good signal from a housekeeping controller which monitors voltages within the power supply.

2. The method of claim 1 wherein the second time period is sufficiently short to prevent overheating of the test load resistor.

3. The method of claim 1 including inactivating the diagnostic test circuit after the first time period has expired.

4. The method of claim 1 including delaying the supplying of power to the test load resistor for the duration of a cool down time delay period to allow the test load resistor to cool.

5. The method of claim 1 including testing to determine if the power good signal indicates power good.

6. The method of claim 5 including activating a first indicator if the power good signal indicates power good, thus indicating a properly functioning power supply.

7. The method of claim 6 including inactivating the first indicator when the first time period has expired.

8. The method of claim 5 including testing to determine if the power supply is connected to a system board of the IHS if the power good signal does not indicate power good.

9. The method of claim 8 including activating a second indicator if the power supply is not connected to the system board of the IHS and the power good signal does not indicate power good, thus indicating an improperly functioning power supply.

10. The method of claim 9 including activating a third indicator if the power supply is connected to the system board of the IHS and the power good signal does not indicate power good, thus indicating that the results of diagnostic testing are undetermined.

11. The method of claim 10 including inactivating the third indicator when the first time period has expired.

12. The method of claim 9 including inactivating the second indicator when the first time period has expired.

13. The method of claim 1 wherein the test is initiated by a customer in response to an instruction received from a call center from which service is requested.

14. An information handling system (IHS) comprising:
    a system board including a processor; and
    a power supply for supplying power to the system board, the power supply including:
        a diagnostic test actuation mechanism;
        a diagnostic test circuit which in response to actuation of the test actuation mechanism is activated for a first time period; and a test load resistor to which power is supplied by the power supply for a second time period within the first time period, the second time period being controlled by the diagnostic test circuit, wherein the power supply includes a housekeeping controller for monitoring voltages within the power supply to provide a power good signal.

15. The IHS of claim 14 wherein the second time period is sufficiently short to prevent overheating of the test load resistor.

16. The IHS of claim 14 wherein the diagnostic test circuit is inactivated after the first time period has expired.

17. The IHS of claim 14 wherein the supplying of power to the test load resistor is delayed for the duration of a cool down time delay period to allow the test load resistor to cool.

18. The IHS of claim 14 wherein the power supply includes a first indicator which is activated if the power good signal indicates power good, thus indicating a properly functioning power supply.

19. The IHS of claim 18 wherein the power supply includes a second indicator which is activated if the power supply is not connected to the system board of the IHS and the power good signal does not indicate power good, thus indicating an improperly functioning power supply.

20. The IHS of claim 18 wherein the power supply includes a third indicator which is activated if the power supply is connected to the system board of the IHS and the power good signal does not indicate power good, thus indicating undetermined results.

21. The IHS of claim 14 wherein the diagnostic test actuation mechanism is a switch which can be activated by a user.

22. The IHS of claim 14 wherein the diagnostic test actuation mechanism is an AC power detector.

23. An information handling system (IHS) comprising:
a chassis;
a microprocessor mounted on a system board in the chassis;
a storage coupled to the microprocessor; and
a power supply for supplying power to the system board, the power supply including:
    a diagnostic test actuation mechanism;
    a diagnostic test circuit which in response to actuation of the test actuation mechanism is activated for a first time period; and
a test load resistor to which power is supplied by the power supply for a second time period within the first time period, the second time period being controlled by the diagnostic test circuit, wherein the power supply includes a housekeeping controller for monitoring voltages within the power supply to provide a power good signal.

24. The IHS of claim 23 wherein the second time period is sufficiently short to prevent overheating of the test load resistor.

25. The IHS of claim 23 wherein the diagnostic test circuit is inactivated after the first time period has expired.

26. The IHS of claim 23 wherein the supplying of power to the test load resistor is delayed for the duration of a cool down time delay period to allow the test load resistor to cool.

* * * * *